Jan. 19, 1932.  J. E. SHEPHERD ET AL  1,841,643
STARTING DEVICE FOR INTERNAL COMBUSTION ENGINES
Filed Sept. 24, 1927  4 Sheets-Sheet 2
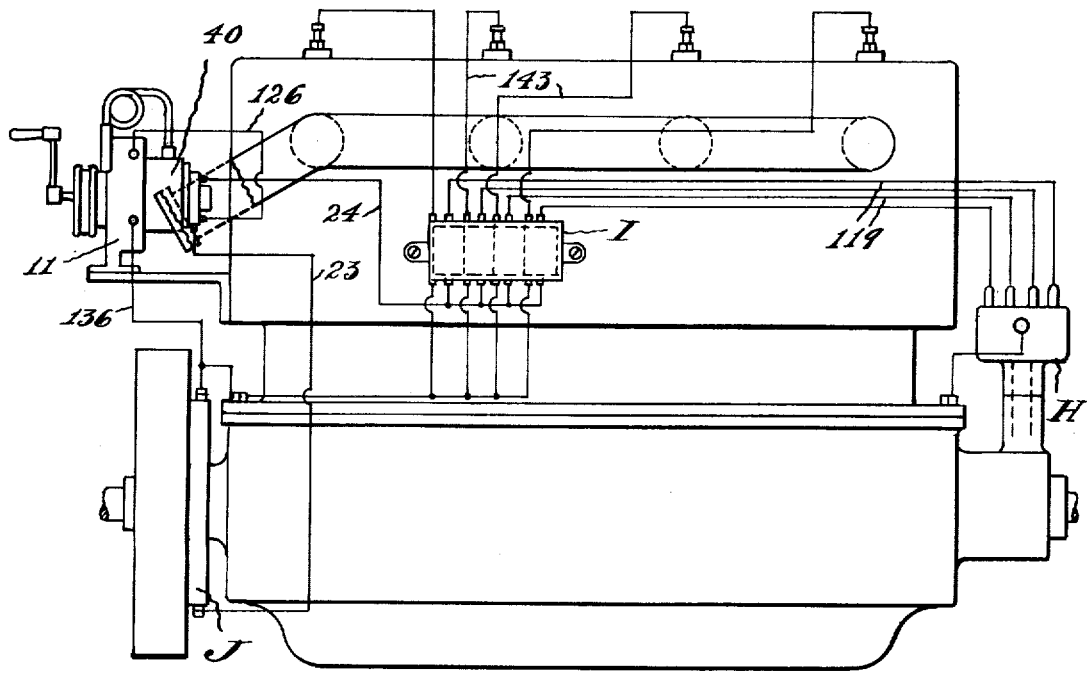
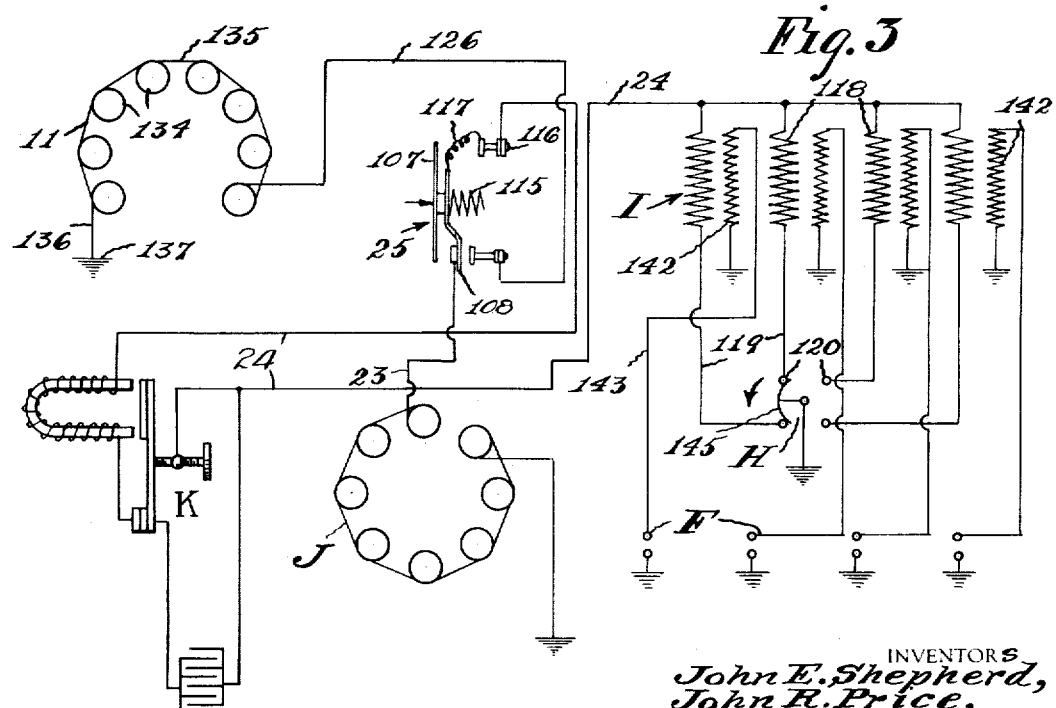
INVENTORS
John E. Shepherd,
John R. Price,
BY
ATTORNEY

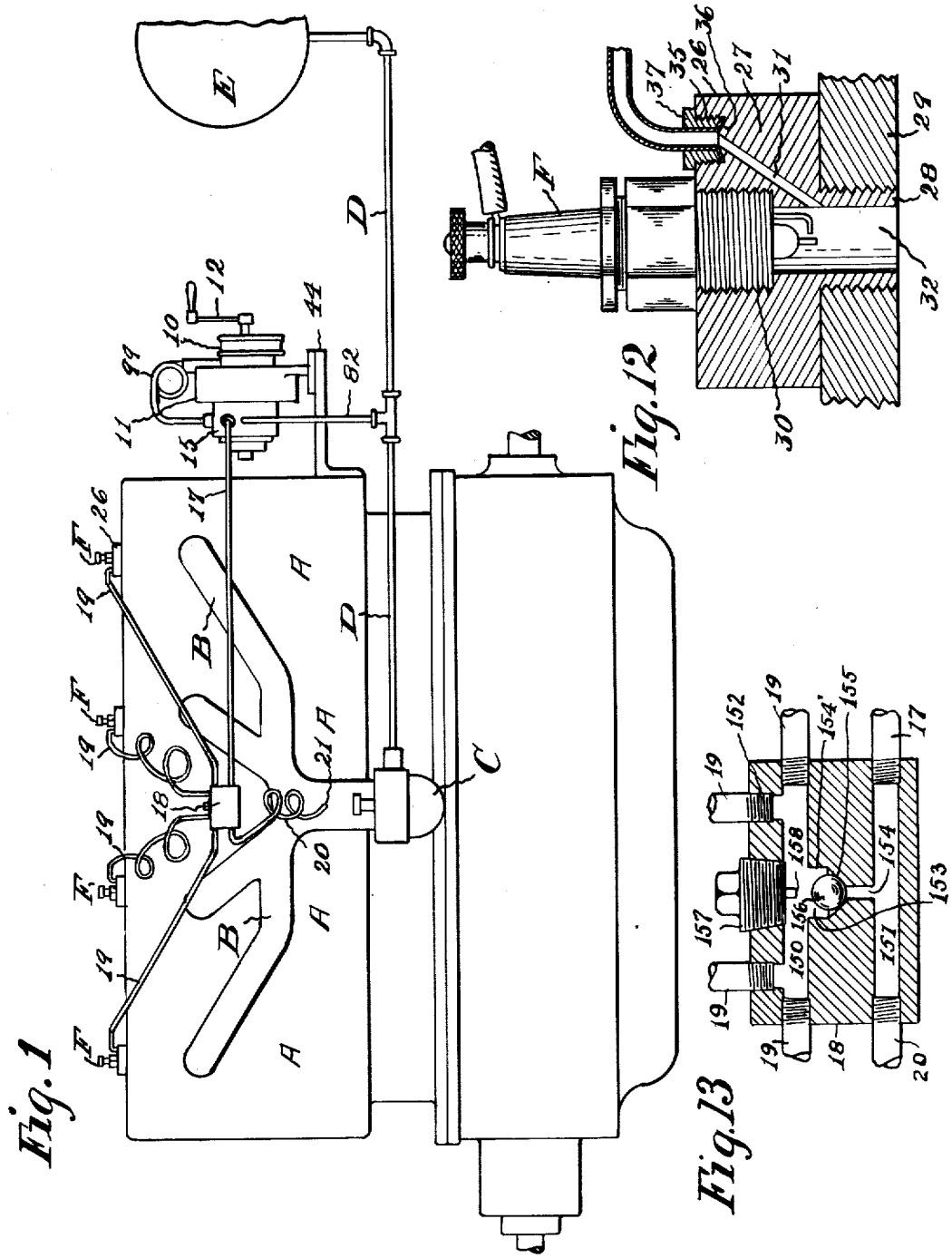

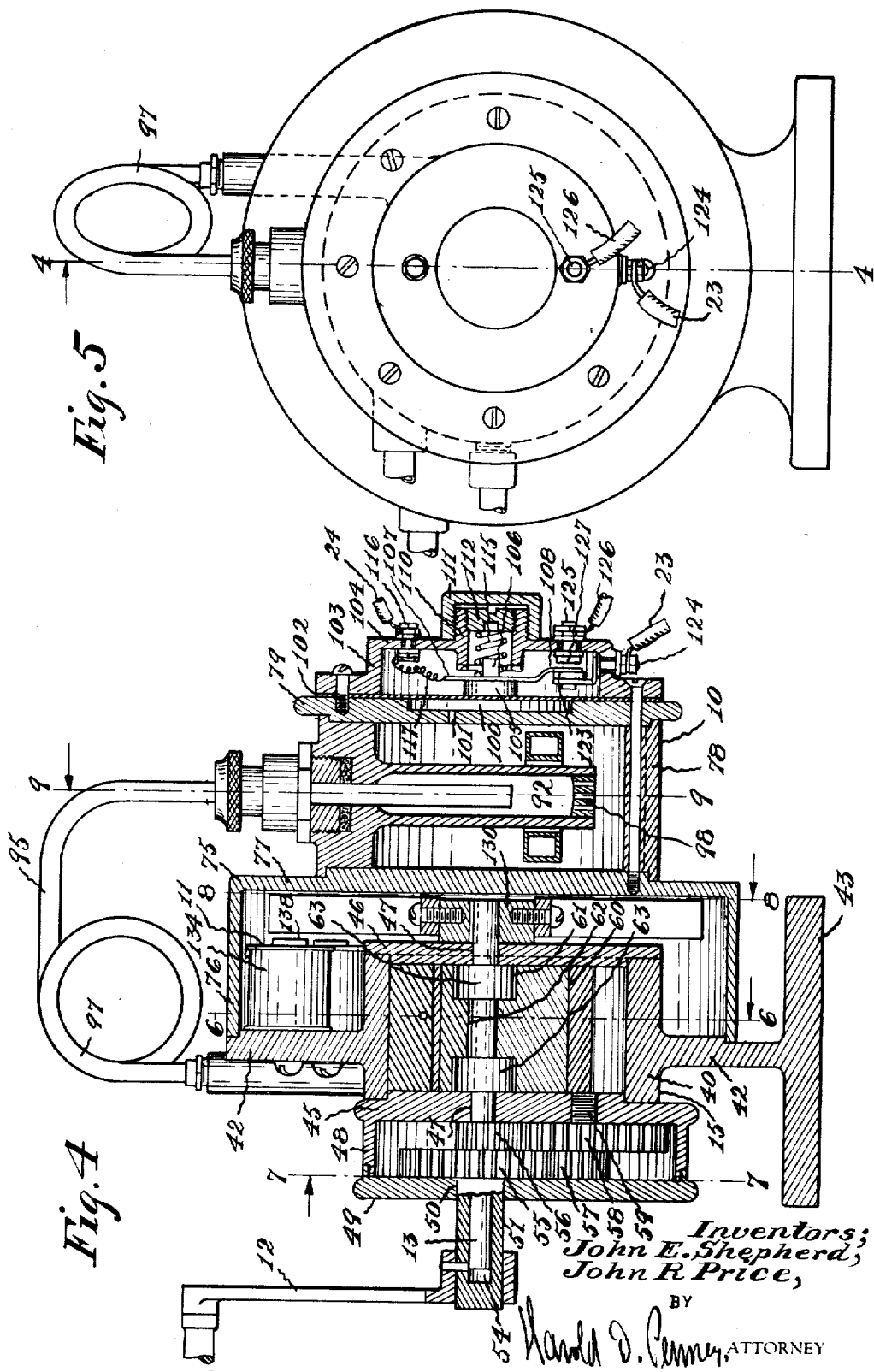

Jan. 19, 1932.  J. E. SHEPHERD ET AL  1,841,643
STARTING DEVICE FOR INTERNAL COMBUSTION ENGINES
Filed Sept. 24, 1927  4 Sheets-Sheet 4
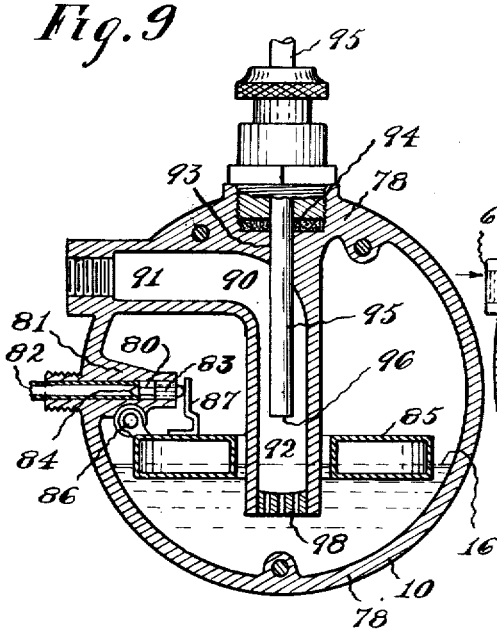
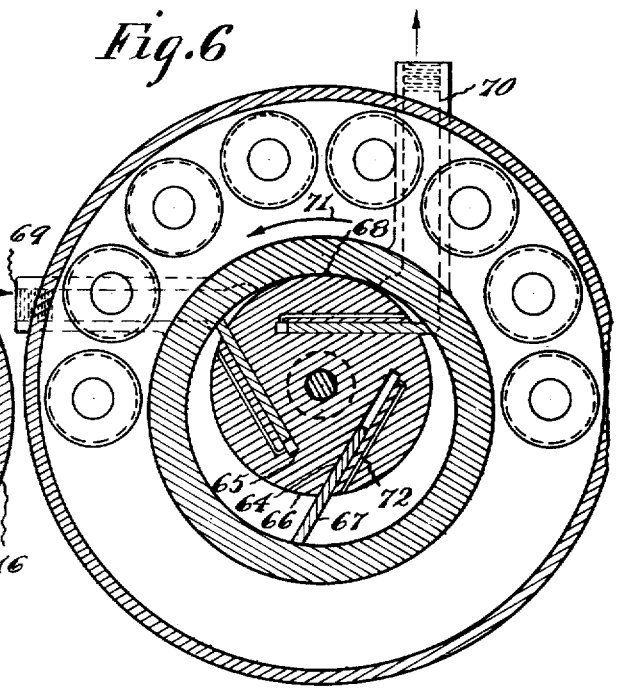
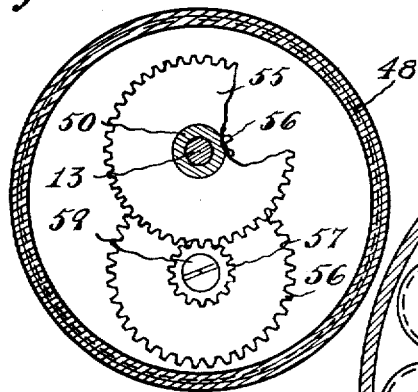
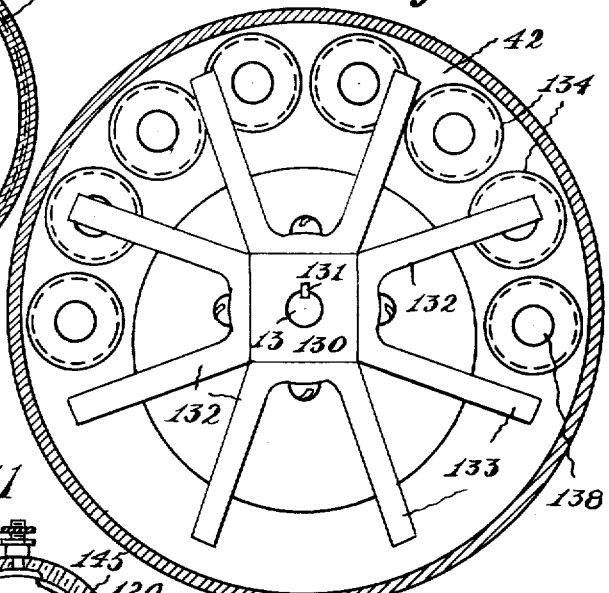
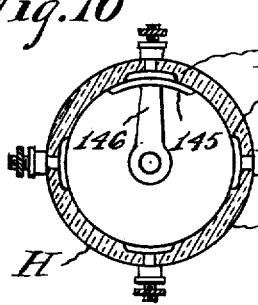
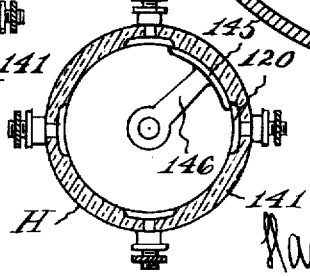
Inventors,
John E. Shepherd,
John R. Price
BY
Harold D. Penny, ATTORNEY Patented Jan. 19, 1932

1,841,643

UNITED STATES PATENT OFFICE

JOHN E. SHEPHERD AND JOHN R. PRICE, OF CHARLOTTESVILLE, VIRGINIA; SAID PRICE ASSIGNOR TO SAID SHEPHERD

STARTING DEVICE FOR INTERNAL COMBUSTION ENGINES

Application filed September 24, 1927. Serial No. 221,716.

Our present invention relates to an improvement in methods of, and apparatus for, starting internal combustion engines, and has for its main object the provision of means whereby any sized engine of this type may be manually started with ease, or, as will be hereinafter ascertained, it may also be readily started by the application of a suitable small primary electric motor as a substitute for hand starting on this apparatus.

The apparatus is made in compact form so that it may be readily applied, as an auxiliary, to any type of engine, preferably without dismantling the same and regardless of the structure, installed type of self-starter, size or use to which such engines may be put.

One of the main and important features of our device relates to the manner in which the same may be attached to and coordinate with self carbureting and ignition systems of such engines, our starter being intended to supplement and cooperate with such systems and thereby create a sequence of starting events whereby to build up the self cycle of the engine itself, after which the starting device immediately and automatically ceases to function, as will be described later more in detail.

Certain features in regard to the details of the starting of the device hereinafter referred to as an anti-bleeding manifold and relates to an apparatus whereby, in the priming of the engine cylinders to start the same, the use of valves to each cylinder priming means of a multi-cylinder engine is obviated, whereby to permit all of the cylinders to receive a starting charge at one time, of equal volume and strength.

The anti-bleeding auxiliary manifold comprises a distributing head and a plurality of non-bleed ducts preferably about one thirty-second of an inch in diameter for conducting fuel vapor from the distributing head to the respective cylinders. A non-bleed duct is a tube of approximately capillary bore which does not permit the passage of drops of liquid fuel, but is so small that the drops of fuel become attached to the walls and smeared along the walls so that only the vapor passes.

Other advantages relate to an improvement in the type of the timer or distributor, whereby to aid in carrying out the herein noted starting method.

Another advantage relates to the details of air compressor utilized in the herein system.

Another advantage relates to the method of prepriming the carbureting manifold of the engine, whereby, when the engine takes up its own cycle, after being started, an immediate supply of engine fuel is prepared and ready for take-up by the engine.

There is also included in the herein system a new form of carbureting means whereby a starting gas mixture is made, for introduction into the engine, and certain novel features will be apprehended in the carburetor, and in the means for setting the same for obtaining true carbureting of the starting gas.

Other advantages relate to the spark plugs whereby the starting fuel charge is admitted to the cylinder thereby obviating any mechanical change in the engine to which the device is attached.

In brief, our device is in the form of an auxiliary carbureting primer and ignition starting device which is attached to the gasoline and carbureting system of an engine and is interpolated into the ignition circuit of an engine and operable by the mere turning of a crank.

Objects of the invention are to bring about all of the above stated advantages and to improve generally the simplicity and efficiency of such methods or devices and to provide a device or apparatus of this kind which is economical, durable and reliable in operation, and economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved engine starter which, briefly stated, includes a priming carburetor, and an auxiliary magneto operated by a hand driven crank shaft which also operates a rotary air compressor to force air through the priming carburetor to form a priming mixture which passes to a distributing head and thence through laterally closed non-bleed ducts of small diameter and equal length to the engine cylinders respectively for priming them for starting, one duct leading from said head to the carburetor end of the manifold to be ready for normal operation as soon as the engine is started. An automatic switch normally connecting the usual engine magneto with the spark coils for normal operation is operated by the priming pressure to connect the auxiliary magneto to the spark coils to cause ignition of the priming charge in the cylinders.

For convenience in attaching the starter to engines as now on the market we provide an improved spark plug mounting comprising a bushing received in the usual spark plug hole of the engine, said bushing receiving the spark plug and having an inlet orifice extending interiorly to near the sparking points and receiving the ends of said ducts for conducting the priming into the interior of the cylinder. By turning the crank shaft by hand or otherwise compressed air is forced through the auxiliary starting carburetor, and the gas charge thus formed is introduced into the engine and a priming, starting charge is also simultaneously introduced into the manifold of the engine proper. Continued cranking of the air compressor causes an automatic building up of air pressures within the system and automatically operates to close an auxiliary electric sparking circuit, the source of current which is obtained from the simultaneous rotation of the auxiliary magneto attached to the air compressor shaft rotating through gearing at proper speeds to create a single phase source of high tension spark plug ignition, whereupon by the induced air pressure in the compressor and the closing of the automatic switch, the spark plug nearest the firing point of the engine is caused to ignite the introduced primary fuel charge, thereby causing the engine to "turn over", after which the pressure in the compressor is reduced and the engine itself picks up its own cycle, picks up the artificially introduced priming charge within its own manifold and then thereafter picks up and operates on its own usual ignition means and self cycle.

Thus, as will be ascertained, the sequence of pressures and ignition are built up by means of a small, manually operable device, comprising a combined separate source of carbureting, and including, within its structure, a separate source of electric ignition, these being started and initiated by our auxiliary device and through certain coordinations with the ignition and carbureting devices of an engine to build up, fire, and initiate the self cycle of an engine from an extraneous, manually manipulatable device requiring but little power to operate.

We have also discovered in devices of this sort that small engines are started in a fraction of a minute, and that larger engines having inherently greater cylinder volume require but little longer to start by reason of building up more volume of gas in larger cylinders.

A further discovery has been made by us, that it is not necessary to utilize high initial pressures in the compressed starting charges, as introduced into the engine, as we have discovered that pressures from two to ten pounds per square inch of pressure of starting gas charge, within the cylinders, at the starting moment, is sufficient to build up, at explosion pressures, a force that will cause the pistons to reciprocate, and, due to the low initial starting compression the starting explosion pressures are also low, thus obviating extremely high and dangerous starting pressures upon the stationary reciprocating parts of the engine. This advantage is obvious.

Obvious modifications may be made in the structures and associated parts thereof, as herein outlined, without departing from the spirit of, or the methods herein outlined, or the apparatus herein disclosed without avoiding the scope of the hereto appended claims.

In the accompanying drawings showing, by way of example, one of many possible embodiments of the invention, Fig. 1 is a side elevation showing the intake manifold side of an engine with our invention applied thereto;

Fig. 2 is a similar side elevation showing the opposite side of the engine;

Fig. 3 is a wiring diagram of the ignition system showing the two magnetos and the pressure operated switch;

Fig. 4 is a longitudinal vertical sectional view, partly in elevation, showing compressor, auxiliary magneto, priming carburetor and pressure switch, the section being taken substantially on the line 4—4 of Fig. 5, looking in the direction of the arrows of said line;

Fig. 5 is an inner end elevation showing the parts of Fig. 4;

Fig. 6 is a transverse vertical sectional view, partly in elevation, showing the compressor in section and parts of the auxiliary magneto in elevation, the section being taken substantially on the line 6—6 of Fig. 4, looking in the direction of the arrows of said line;

Fig. 7 is a fragmental transverse vertical sectional view, partly in elevation, showing the step-up gearing, the section being taken substantially on the line 7—7 of Fig. 4, looking in the direction of the arrows of said line;

Fig. 8 is a transverse vertical sectional view, showing the auxiliary magneto in elevation, the section being taken on the line 8—8 of Fig. 4;

Fig. 9 is a transverse vertical sectional view, partly in elevation, showing the priming carburetor, the section being taken on the line 9—9 of Fig. 4;

Figs. 10 and 11 are sectional views through the distributor, showing two different positions thereof;

Fig. 12 (Sheet 1) is a longitudinal vertical sectional view, partly in elevation, showing the spark plug mounting; and Fig. 13 is a longitudinal vertical sectional view through the distributing head.

Our invention is herein shown, merely by way of example, in combination, with an internal combustion engine A comprising. a block of cylinders and having a usual intake manifold B, a carburetor C, a feed line pipe D, from the fuel tank E to the carburetor C. Said engine has an ignition system comprising spark plugs F, a distributor H (Figs. 2 and 3) and usual spark coils I, magneto J and vibrator K for normal operation of the engine.

The starting device comprises a priming carburetor 10 (Figs. 1 and 4) for first priming the cylinders, an auxiliary magneto 11 (Figs. 3 and 4) for igniting the priming fuel in the cylinders, a crank 12 (Figs. 1 and 4) driving a shaft 13 for said magneto, and a rotary air compressor 15, driven by said shaft 13 and adapted to force compressed air through the fuel liquid 16 (Fig. 9) in the priming carburetor to form a priming mixture which passes through a duct 17 (Fig. 1) to a distributing head 18. A plurality of non-bleed distribution ducts 19 of equal small diameter and equal length lead from said distributing head to each cylinder head for equally priming the cylinders for starting the engine. There is also one duct 20 leading from the distributing head to the carburetor end 21 of the manifold so that as soon as the engine is started by the starting device the manifold will be already primed with a proper fuel mixture for normal operation. Means including conductors 23 and 24 and a pressure operator switch 25 normally connect the usual vibrator K and magneto J with the spark coils I for normal operation. As will be explained, this switch is adapted to be operated by the priming air-pressure in the compressor 15 and carburetor 10 to connect the auxiliary magneto 11 to the spark coils whereupon a quick additional turn of the crank 12 will cause ignition of the priming charge previously forced into the engine cylinders by said compressor. The priming charge enters the cylinders from the non-bleed ducts 19 (Fig. 1), through a special spark plug mounting 26 comprising a bushing having a base 27 (Fig. 12, Sheet 1), a threaded extension 28 received in the spark plug hole of the engine cylinder head 29, and a threaded axial bore 30 receiving the spark plug F. This bushing also has a priming inlet duct 31 extending from the outer face of the base into the lower part 32 of said bore near the sparking points of the spark plug. Said duct 31 has its outer end provided with a threaded enlargement 35 forming a conical shoulder 36 receiving the discharge end of the non-bleed ducts, the latter being flared and received against said shoulder and there held by a threaded bushing 37 in said enlargement pressing the flared end against said shoulder to form a tight solderless joint. The compressor 15 comprises an interiorly smooth axially horizontal cylinder 40 (Fig. 4) provided between its ends with a vertical supporting flange 42 having a base 43 mounted on a bracket 44 (Fig. 1) on the end of the engine A. Outer and inner heads 45, 46 (Fig. 4) fitted on said cylinder are provided with eccentric alined bearing bores 47. The outer head 45 has an outstanding flange 48 forming a gear housing wall carrying a cover plate 49 having a large bore 50 alined with said bearing bores 47 and receiving a crank shaft 51 rotary in said bore and carrying the crank 12 thereon. Said shaft 51 has an inwardly opening axial bore 54 receiving the shaft 13. For increasing the speed of the shaft 13 we provide speed increasing or step-up gearing in the gear housing comprising large and small gears 55, 56 fast on said crank shaft 51 and magneto shafts 13 respectively, and an idler set comprising small and large pinions 57, 58 secured fast to each other and carried on a pin 59 and meshing respectively with said large and small gears. It is understood that the invention is not limited to crank operation of the shaft 13, as distinguished from motor operation or other operation of any kind.

A cylindrical rotor 60 received on said shaft 13 in engagement with said heads 45, 46 and one side only of the interior of the cylinder 40, has an axial bore receiving the shaft 13 and having cylindrical countersunk enlargements 61 at both ends. Said bore and shaft are provided with key seats receiving a key 62, whereby the rotor is keyed to the shaft. This key is held against axial displacement by collars 63 received on said rotor shaft in said enlargements 61.

The peripheral part of said rotor 60 is provided with backwardly inclined, wide thin, longitudinal recesses 64 (Fig. 6) each having its forward edge 65 closed and extending to near the peripheral face 66 of the rotor, the other edges of the recesses opening into the end and peripheral faces of the rotor. Reciprocatory piston blades 67 snugly slidably received in said recesses engage with said heads and, at an approximate line of contact, as at 68, with the cylinder wall. The cylinder 40 has an inlet port 69 near and to the rear of said line of contact 68, and an outlet pressure port 70 near and forward of said line, whereby as the rotor is rotated forwardly, in the direction of the arrow 71 of Fig. 6, by means of said crank, the air is drawn in at the inlet port, compressed forwardly of the next oncoming blade and forced out at said outlet port 70.

The rotor is provided just forward of, and parallel to, each recess, 64 with a compressed air conducting duct 72 having its outer end opening into the peripheral face of the rotor near the peripheral edge of the recess and its inner end opening adjacent to the inner edge 65 of the recess, whereby air under pressure in the cylinder passes into the inner portion of the recess and presses the blade outwardly into good contact with the cylinder wall.

A magneto housing 75 (Fig. 4) encloses the auxiliary magneto 11 and has an inner flange 76 mounted on the inner face of the periphery of said supporting flange 42, and a circular body wall 77 spaced from said inner head 76 and carrying the carburetor 10 on its exterior face.

The carburetor 10 comprises an axially horizontal cylindrical wall 78 mounted at one edge on said body wall 77 and supporting a cover 79 mounted on the outer wall edge. Said wall 78 (Fig. 9) is formed with an inwardly pointed lateral fuel-inlet-valve bore surrounded by a projecting boss 81 receiving a fuel feed pipe 82 from the feed pipe D. A fuel feed pipe 82 is secured in the bore with its inner end forming a valve seat receiving a cylindrical valve member 83 slidable in said bore and having an intermediate reduced portion, a longitudinal recess therefrom to leave passage for the fuel, and a conical inner end 84 engageable with said seat. An elongated annular float pivoted to said boss, as at 86, carries thereon a bracket 87 thereon adapted to press against and close the valve member 83 when the liquid 16 raises the float to the desired level.

The cylindrical wall 78 is cast with an elbow shaped vapor duct 90 having one arm 91 extended laterally from the upper part of the carburetor and connected by the duct 17 (Fig. 1) to said distributing head 19. The other arm 92 extends centrally downwardly to near the bottom of the carburetor and into the liquid 16. The upper part of said wall 78 is provided with a bore 93 extending co-axially into the downwardly extended arm 92 and provided with a packing gland 94 around the upper end, through which passes a compressed air pipe 95 extending from said outlet port 70 (Fig. 6) of the compressor, through said packing and axial bore to provide a discharge end 96 near the liquid level. Said air pipe is intermediately coiled, as at 97 (Fig. 4), for flexibility to permit adjustment of the pipe in the packing and the discharge end 96 relative to the liquid level, whereby a blast of compressed air may be directed upon and agitate the liquid, whereby to take up vapor and send a fuel mixture through the duct 90 to the distributing head and thence to the cylinders and manifold for priming them.

A perforated baffle plug 98 in the lower end of the arm 92 baffles the blast of air but permits the liquid to rise to the blast.

The outer face of said carburetor cover 79 (Fig. 4) is intramarginally recessed to form a pressure chamber 100 communicating by an orifice 101 with the interior of the carburetor. A diaphragm 102 across said chamber is held in place by flanged side walls 103 of a disk shaped switch-housing 104. A button 105 mounted on the mid-part of the diaphragm and provided with a central projection 106 carries a switch blade 107 mounted on the face of the button and having a contact end 108. The switch housing is formed centrally with a spring housing 110 co-axial with said button end exteriorly threaded at the outer end to receive a cap 111, and interiorly threaded to receive a plug 112, against which is disposed a spring 115 interposed between said plug and button and received on said projection 106, adapted normally to press the diaphragm inward and to yield when the crank is turned to generate pressure in the carburetor for priming, thereby to move the diaphragm and switch blade outward.

A binding bolt 116 passed through and insulated from the switch housing and having the inner end flexibly electrically connected, by a conductor 117, to said blade, has its outer end electrically connected by the conductor 24 to the ignition system primaries 118 (Fig. 3), in turn connected by conductors 119 to the fixed contacts 120 of the timer H.

An inner normal operation contact 123 (Fig. 4) mounted in the timer housing on an insulated stud 124 is electrically connected by the conductor 23 (Figs. 3 and 4) to the regular magneto J of the engine, whereby when air in the starting compressor is not being compressed, and the switch blade is pressed by the spring 115 (Fig. 4) against the normal operation contact 123 the ignition system is connected to the regular magneto and the engine operated normally.

An insulated auxiliary magneto binding-post 125 connected to the auxiliary magneto 11 by the conductor 126 (Figs. 3 and 4) and passing through the switch housing and carrying at its inner end a starting operation contact 127 (Fig. 4) is engageable by the switch-blade contact end 108 when moved outwardly from pressure within the priming carburetor thereby to connect the auxiliary magneto with the ignition system for starting.

The magneto 11 comprises a squared hub 130 (Figs. 4 and 8) in the magneto housing, keyed by the key 131 on the projecting end of the shaft 13 and carrying a plurality of permanent horse shoe magnets 132 secured having their yoke parts secured by screws to the side faces of the hub and having their arms approximately radial to the shaft and diverged to space the poles 133 equidistantly around the periphery of the magneto housing, in proximity to a plurality of stationary armature coils 134 connected by conductors 135, 126 and 136 (Fig. 3) in series with each other and between said auxiliary binding post 124 and the ground 137 and provided with cores 138 (Figs. 4 and 8) secured fast on the supporting flange 42 with the core poles adjacent to the magnet poles 133, whereby, after priming pressure has been generated in the compression and the cylinders primed and the diaphragm has shifted the switch to connect with the auxiliary magneto 11, a quick additional turn of the crank 12 sets up impulses in the series of coils 134 and 118 and causes sparking for starting the engine as will be explained.

The timing distributor H (Figs. 2 and 3) comprises elongated fixed contacts 120 (Figs. 10 and 11) mounted in an insulating housing 141 and connected by conductors 119 to the respective primaries 118 which generate sparking current in the associated secondaries 142 grounded at one end and connected at the other end by conductors 143 to the spark plugs F.

The revolving contact of the timer comprises an elongated revolving shoe 145 (Fig. 10) engaging said contacts 120 successively, and grounded through the timing arm 146 to the frame of the machine. Said shoe 145 is so timed that the leading end thereof will engage each contact 120 at the instant that the piston of the associated cylinder is in position for ignition in normal operation so that sparking will be initiated at the proper instant, but said shoe is sufficiently lengthened rearwardly to cause contact and sparking in said cylinder to be maintained throughout the entire working stroke of such cylinder and a short while at the beginning of the exhaust stroke thereof, by which time the advance end of the shoe will have reached the fixed contact 120 of the next cylinder to be ignited. Thereby, said shoe is always in contact with at least a fixed contact and as it passes from one contact to another (Fig. 11) it engages two adjacent contacts, to insure contact which will give priming sparking at any position of the working stroke of at least one cylinder in any position whatever of the engine. By this arrangement, when the engine is at rest at any whatever initial position, slow turning of the starting crank 12 will force priming mixture into the cylinders; and a subsequent quick turn of the crank will cause sparking in at least one cylinder having its piston in the correct position to receive the force of the explosion and cause the engine to start, the manifold also being filled with priming mixture to cause the engine to operate on its own self cycle as soon as started. In order to prevent the pressure from the explosion in the cylinder from passing back into the compressor and diaphragm chamber 100, we provide suitable check valve means which may, for instance, be disposed in the distributing head. Such an arrangement is shown in Fig. 13 in which the distributing head 18 is provided with upper and lower horizontal ducts 150, 151 and branch ducts 152 entering the upper duct. A cross duct 153 having a reduced lower end 154 entering the lower duct is provided with an enlarged upper portion 154' passing through the upper duct and the top face of the head and having its lower part downwardly coned to form a valve-ball seat 155 receiving a check-valve ball 156.

The outer ends of all of said ducts are threaded to receive the pipes 17, 19 and 20, and also a plug 157 in the upper end of the cross duct provided with a downward projection 158 for holding the ball in the cross duct but permitting the ball to leave the seat for the passage of the priming mixture.

It is thus seen that the pressure of the explosion cannot pass the ball 156 back into the manifold on the compressor. Any suction generated in the manifold and communicated to the compressor is not sufficient to move the compressor piston blades or rotor.

The operation will be easily understood from the foregoing and need now be only briefly summarized as follows:

The placing of fuel in the tank E for normal running of the engine is all that is needed in preparation for the operation of the starter, since this insures that fuel from the tank E will pass through the pipes D and 82 until the proper level of liquid 16 (Fig. 9) in the priming carburetor 10, whereupon the valve 83 is closed by the float.

Assuming that the engine is at rest in any position, and the crank 12 has not yet turned for starting, the switch blade 107 is in the position of Fig. 3 and the ignition system is still connected through the switch and conductors 23, 24 to the usual magneto J. In this position at rest some one of the four pistons must be at the beginning or some intermediate point with its associated contact 120 engaged by the shoe 145; and the piston next following in the engine cycle must be at some point of the compression stroke.

To start the engine, the crank 12 is turned at medium speed, thus forcing air through the pipe 95 (Fig. 4) against the liquid 16 (Fig. 9) in the duct arm 92, where the air takes up vapor and passes through the ducts 17, 19 and 20 into all the cylinders and manifold B, priming them with fuel vapor. The turning of the crank continues a few moments until about ten pounds pressure has been generated, which is easy to determine by the feel of the crank. This pressure forces out the diaphragm 102 and connects the switch and ignition system with the auxiliary magneto, whereupon a quick additional turn is given to the crank, thereby to generate sparking impulses and cause sparking and ignition in whatever cylinder whose piston is at any part of its working stroke, thus causing said piston to move and the engine to turn over until the contact shoe reaches the next fixed contact 120 causing ignition and starting pressure in the piston next in the cycle. By this time the pressure in the priming carburetor has dropped sufficiently to cause the switch blade 107 to connect the engine magneto with the ignition system, and as the intake manifold has already been primed through the pipe 20 (Fig. 1), the engine immediately picks up on its own cycle.

Having thus described our invention what we claim is:

1. The herein method of starting a gas engine which consists in compressing air to a pressure of from two to ten pounds, then passing said air through an auxiliary liquid fuel container to make an engine priming charge, then passing said priming charge to said engine and its intake manifold, then supplying an auxiliary electric igniting charge to said priming charge to explode the same and then permitting the engine to pick up and operate under its charge making and ignition means, independently of the said priming and auxiliary ignition means.

2. A starter of the class described, in combination with a gas engine, comprising an air compressor, a liquid fuel container, a fuel duct therebetween, means for conducting a fuel charge from said fuel container to said engine, a magneto, a driving shaft common to said compressor and said magneto, means on said driving shaft for rotating the magneto and compressor whereby to compress air through said liquid fuel container and to simultaneously operate said magneto; and a switch associated therewith mounted for operation by air pressure from said compressor whereby to cause current from said magneto to ignite the fuel charge in said engine.

3. A starter of the class described comprising, in combination with a gas engine, of an auxiliary manually rotatable starting device including a magneto, a compressor, a liquid fuel container and a diaphragm switch operated by said compressor, means leading from said fuel container whereby to distribute fuel therefrom to the cylinders of an engine, and means leading from said magneto and said switch to the ignition means of said engine.

4. A starter of the class described comprising, in combination with a gas engine, an auxiliary rotatable starting device including a magneto, a compressor, a liquid fuel container and a diaphragm switch operated by said compressor, means leading from said fuel container whereby to distribute fuel therefrom to the cylinders of an engine, means leading from said magneto and said switch to the ignition means of said engine, and a manually controlled means for causing operation of said starter.

5. In a starter of the class described comprising, in combination with a gas engine, including its ignition and carbureting means, of a starter comprising an auxiliary operable magneto, a low pressure air compressor operatively associated with said magneto, a liquid fuel container associated with said compressor, and a diaphragm switch operated by said compressor, means leading from said fuel container whereby to distribute fuel therefrom to the cylinders of the engine, and ignition means leading from said magneto and said switch to the ignition means of said engine.

6. In a starter of the class described, comprising in combination with a gas engine, including its ignition and carbureting means, of a starter comprising a manually operable magneto, a low pressure air compressor operatively associated with said magneto, a liquid fuel container associated with said compressor and a diaphragm switch operated by said compressor, means leading from said fuel container whereby to distribute fuel therefrom to the cylinders of the engine, ignition means controlled by said switch leading from said magneto to the ignition means of said engine.

7. In a gas engine priming starter of the class described comprising an air compressor, a magneto, a liquid fuel container, means between said compressor and said container whereby to create an explosive charge for an engine, a series of non-bleeding fuel conducting ducts from said fuel container to the plural cylinders of an engine, each of said fuel conducting means comprising a duct of comparatively small diameter.

8. In a gas engine priming starter of the class described comprising an air compressor, a magneto, a liquid fuel container all in a unitary structure, means between said compressor and said container whereby to create an explosive charge for an engine, a series of non-bleeding fuel conducting ducts from said fuel container to the plural cylinders of an engine and to the carbureting means therefor, each of said fuel conducting means comprising a duct of comparatively small diameter.

9. In a gas engine priming starter of the class described comprising, a unit structure including an air compressor, a magneto, a liquid fuel container, means between said compressor and said container whereby to create an explosive charge for an engine, a series of non-bleeding fuel conducting ducts from said fuel container to the plural cylinders of an engine and to the carbureting means therefor, each of said fuel conducting means comprising a duct of comparatively small diameter, said ducts being all of equal diameter and length.

10. In a starter of the class described comprising, in combination, with an engine having ignition and carbureting means, of an auxiliary source of electric ignition, an auxiliary source of air compression, an auxiliary explosive gas charge carburetor, a compressor pressure operated switch for connecting the auxiliary electric source to the ignition means, means for leading an explosive gas charge from said auxiliary carburetor to the cylinders of the engine, and a separate engine carbureting priming means between said auxiliary carburetor and the carburetor of the engine whereby the said engine carbureting means may be pre-primed simultaneous with the priming of the said engine cylinders.

11. In a starter of the class described, in combination, with an engine having ignition and carbureting means, and an intake manifold, of an auxiliary source of electric ignition, an auxiliary source of air compression, an auxiliary priming explosive gas charge carburetor, a compressor pressure operated switch for connecting the auxiliary electric source to the ignition means, means for leading an explosive gas charge from said auxiliary carburetor to the cylinders of the engine, and a separate engine carbureting priming means between said auxiliary carburetor and the intake manifold of the engine whereby the said manifold may be pre-primed simultaneous with the priming of the said engine cylinders.

12. In a starter of the class described comprising, in combination, with an engine having ignition and carbureting means and an intake manifold, of an auxiliary source of electric ignition, an auxiliary source of air compression, an auxiliary priming starter carburetor, a compressor pressure operated switch, means for conducting an explosive gas charge from said auxiliary carburetor to the cylinders of the engine, a separate engine priming means between said auxiliary carburetor and the intake manifold of the engine whereby the said manifold may be pre-primed simultaneous with the priming of the said engine cylinders, and means between said auxiliary electric ignition and switch and the ignition means of the engine whereby the priming charge in the engine may be exploded by said auxiliary electric ignition.

13. In a starting mechanism of the class described, comprising the combination with a gas engine of an auxiliary engine priming device including an auxiliary ignition means therefor and a rotary timer for timing the current from said auxiliary ignition means to the spark plugs of said engine, said timer having a rotary contact member having a circumferentially extended wiper element thereon whereby to bridge two associated contacts as and for the purpose described.

14. In an engine, the combination of an auxiliary magneto; a priming carburetor; an air compressor to force air through the priming carburetor to form priming mixture; unitary means for driving the compressor and auxiliary magneto; and means to conduct the mixture from the priming carburetor to the engine cylinder.

15. In an engine, the combination of a priming carburetor; a rotary auxiliary magneto; a rotary air compressor to force air through the priming carburetor to form priming mixture; means including a single shaft for said magneto and compressor for driving the compressor and auxiliary magneto; and means to conduct the mixture from the priming carburetor to the engine cylinder.

16. In an engine, the combination of an auxiliary magneto; a priming carburetor; an air compressor to force air through the priming carburetor to form priming mixture; hand operated unitary means for driving the compressor and auxiliary magneto; means to conduct the mixture from the priming carburetor to the engine cylinder.

17. In an engine, a carburetor, and an ignition system comprising a timer, spark plugs and a normal operation magneto, the combination of a priming carburetor; an auxiliary magneto; a device to force priming mixture from the priming carburetor to the engine cylinder; and means automatically operated by said device to connect the auxiliary magneto to the ignition system.

18. In an engine having an ignition system, the combination of a priming carburetor; an auxiliary magneto; an air compressor to force air through the priming carburetor to form priming mixture; means for conducting the mixture from the priming carburetor to the engine cylinder; and means operated by the priming pressure to connect the auxiliary magneto to the ignition system.

19. In an engine having an ignition system having a normal-operation magneto, the combination of a priming carburetor; an auxiliary magneto; a device to force priming mixture from the priming carburetor to the engine cylinder; and a switch automatically operated by said device to connect the auxiliary magneto to the ignition system and disconnect the normal-operation magneto.

20. In an engine having an ignition system, the combination of a priming carburetor; an auxiliary magneto; an air compressor to force air through the priming carburetor to form priming mixture; means for conducting the mixture from the priming carburetor to the engine cylinder; a diaphragm operated by the priming pressure; and a switch operated by the diaphragm to connect the auxiliary magneto to the ignition system.

21. In a multi-cylinder engine having an intake manifold, a carburetor, and an ignition system comprising a timer, spark plugs and a normal-operation magneto; the combination of a priming carburetor; an auxiliary magneto; an air compressor to force air through the priming carburetor to form priming mixture; unitary means for driving the compressor and auxiliary magneto; means for conducting the mixture from the priming carburetor to the engine cylinder and to the manifold; and means including a switch normally connecting the engine magneto with the ignition system and operated by the priming pressure to connect the auxiliary magneto to the ignition to cause ignition of the priming charge.

22. In an engine, a carburetor, a manifold and an ignition system comprising a timer, spark plugs and a normal operation magneto, the combination of a priming carburetor; an auxiliary magneto; a device for forcing fuel from the priming carburetor to the manifold and engine cylinder; and means operated by said device to automatically connect the auxiliary magneto to the ignition system.

23. In a multi-cylinder engine having a intake manifold, the combination of means for priming the engine cylinder and the manifold; ignition means for normal operation and for starting including a timer comprising fixed contacts; a revolving shoe engaging said contacts successively; said shoe being timed for normal operation and long enough to be always in contact with at least one fixed contact.

24. In a multi-cylinder engine having an intake manifold, a carburetor, and an ignition system comprising spark coils having primaries and secondaries, spark plugs connected to the secondaries, a normal-operation magneto normally connected to the primaries, and the combination of a priming carburetor; means for conducting the mixture from the priming carburetor to the engine cylinder and to the manifold; an auxiliary magneto adapted to be connected to said primaries for starting; and a timer comprising fixed contacts connected to the respective primaries and a grounded elongated revolving shoe engaging said contacts successively; said shoe being so timed that its leading end will engage each contact at the instant that the associated piston is in position for ignition in normal operation, the shoe being sufficiently lengthened rearwardly to cause sparking in said cylinder throughout the working stroke of such cylinder and a short while at the beginning of the exhaust stroke thereof.

25. In a multi-cylinder engine having an intake manifold, a carburetor, and an ignition system comprising spark coils having primaries and secondary spark plugs connected to the secondaries, a normal-operation magneto normally connected to the primaries, and the combination of a priming carburetor; means for conducting the mixture from the priming carburetor to the engine cylinder and to the manifold; an auxiliary magneto; means adapted to disconnect the normal operation magneto from and connect the auxiliary magneto to said primaries for starting; and a timer comprising fixed contacts connected to the respective primaries and an elongated revolving shoe engaging said contacts successively and being long enough always to engage at least one fixed contact.

26. In a multi-cylinder engine, the combination of a carburetor; and non-bleeding ducts of substantially equal resistance from said carburetor head to the engine cylinders.

27. In an engine having a manifold, the combination of a priming carburetor; and non-bleeding ducts of equal length and diameter from the priming carburetor to the engine cylinders; the inner diameter of said ducts being small enough to prevent the passage of drops of liquid fuel and so small that the drops of fuel become attached to the walls of the duct so that only vapor passes.

28. In an engine, the combination of a carburetor; means to force air through the carburetor to form mixture; a distributing head; a pipe from the carburetor to said head; non-bleeding ducts of equal diameter and length from said head to the engine cylinders; the inner diameter of said ducts being small enough to prevent the passage of drops of liquid fuel and so small that the drops of fuel become attached to the walls of the duct so that only vapor passes.

29. In an engine, the combination of a priming carburetor; means to force air through the priming carburetor to form mixture; a head; a pipe from the carburetor to said head; non-bleeding ducts of equal diameter and length from said head to the engine cylinders; and a duct from said head connecting said pipe to the manifold.

30. In a multi-cylinder engine having an intake manifold, a carburetor, and an ignition system comprising a normal-operation magneto; the combination of a priming carburetor having a flange therearound; a housing on said flange; an auxiliary magneto therein; a rotary air compressor to force air through the priming carburetor to form priming mixture; a shaft for driving the compressor extending into the housing; means for conducting the mixture from the priming carburetor to the engine cylinder and to the manifold; and means connecting either magneto with the ignition system; said magneto comprising a hub in the magneto housing on said shaft, horse shoe magnets secured on the hub and having their poles spaced equidistantly around the periphery of the housing and armature coils provided with cores fast on said flange with poles adjacent to said poles.

31. In an engine having an ignition system having a normal operation magneto, the combination of a pressure operated priming carburetor having thereon a pressure chamber communicating therewith; an auxiliary magneto; to form priming mixture; means for conducting the mixture from the priming carburetor to the engine cylinder; a diaphragm across said chamber; a switch housing secured over said diaphragm; a button on the diaphragm; a contact blade on the button; a binding bolt passed into and insulated from the switch housing and flexibly electrically connected to said blade, the outer end of the bolt being electrically the ignition system; an inner normal operation contact mounted in the timer housing and to the normal-operation magneto normally contacted by the switch blade; and an auxiliary-contact binding-post connected to the auxiliary magneto and at its inner end engageable by the switch blade when moved outwardly from priming pressure within the priming carburetor.

32. In an engine, the combination of a cylinder; a magneto; a device to force fuel into the cylinder; and unitary means driven by means other than said engine for driving said device and magneto.

33. In an engine, the combination of a cylinder; a magneto; a priming device to force priming mixture into the cylinder; and unitary means for driving said device and magneto.

34. In an engine, the combination of a magneto; a carburetor; an air compressor to force air through the carburetor to form mixture; hand operated unitary means for driving the compressor and auxiliary magneto; and means to conduct the mixture from the carburetor to the engine cylinder.

Signed at New York, in the county of New York and State of New York, this 23rd day of September, A. D. 1927.

JOHN E. SHEPHERD.
JOHN R. PRICE.